(12) United States Patent
Spang et al.

(10) Patent No.: US 12,083,965 B2
(45) Date of Patent: Sep. 10, 2024

(54) MOUNTING SYSTEM FOR DETACHABLY MOUNTING ELECTRONIC DEVICES IN A MOTOR VEHICLE

(71) Applicant: Kinetix AG, Chur (CH)

(72) Inventors: Peter Spang, Waldachtal (DE); Jürgen Heidinger, Munich (DE); Wolfgang Fischer, Ammerbuch (DE); Michael Andreas Keller, Freudenstadt (DE); Michael Braun, Altensteig (DE)

(73) Assignee: Kinetix AG, Chur (CH)

( * ) Notice: Subject to any disclaimer, the term of this patent is extended or adjusted under 35 U.S.C. 154(b) by 181 days.

(21) Appl. No.: 17/886,780

(22) Filed: Aug. 12, 2022

(65) Prior Publication Data

US 2023/0050234 A1 Feb. 16, 2023

(30) Foreign Application Priority Data

Aug. 13, 2021 (DE) .................... 20 2021 104 338.5

(51) Int. Cl.
*B60R 11/02* (2006.01)
*B60R 11/00* (2006.01)

(52) U.S. Cl.
CPC ...... *B60R 11/0241* (2013.01); *B60R 11/0252* (2013.01); *B60R 2011/0059* (2013.01); *B60R 2011/0085* (2013.01); *B60R 2011/0294* (2013.01)

(58) Field of Classification Search
CPC .. H04M 1/04; B60R 11/0241; B60R 11/0252; B60R 2011/0059; B60R 2011/0294; B60R 2011/0085; B60R 2011/0071; B60R 2011/0075; B60R 2011/008; B60R 11/02
See application file for complete search history.

(56) References Cited

U.S. PATENT DOCUMENTS

| 2011/0121148 A1* | 5/2011 | Pernia | F16M 11/14 |
| | | | 248/207 |
| 2014/0138419 A1 | 5/2014 | Minn et al. | |
| 2015/0329062 A1* | 11/2015 | Ackeret | B60R 11/02 |
| | | | 248/220.22 |

FOREIGN PATENT DOCUMENTS

| DE | 202015107110 U1 | 4/2016 |
| DE | 112014005009 B4 | 9/2016 |
| WO | 03/002376 A1 | 1/2003 |

OTHER PUBLICATIONS

European Office Communication dated Jan. 19, 2023.
National Products; "Catalogue National Products Inc.," Jan. 2020; XP55818576A, pp. 1-32.
German Search Report dated May 5, 2022.

* cited by examiner

*Primary Examiner* — Tuan D Nguyen
(74) *Attorney, Agent, or Firm* — Dilworth & Barrese, LLP

(57) ABSTRACT

A mounting system (10) for detachably mounting electronic devices in a motor vehicle, comprising a connecting section (12) for connection to the motor vehicle, with a first holder (30) connected to the connecting section, which first holder (30) has a first holding space (48) and first holding sections (42, 46) for holding a first electronic device (50), with a second holder (52) with a second holding space (54) for holding a second electronic device (56), wherein the second holder can be arranged or is arranged in the first holding space and can be detachably fixed or is detachably fixed to the first holding sections.

20 Claims, 8 Drawing Sheets

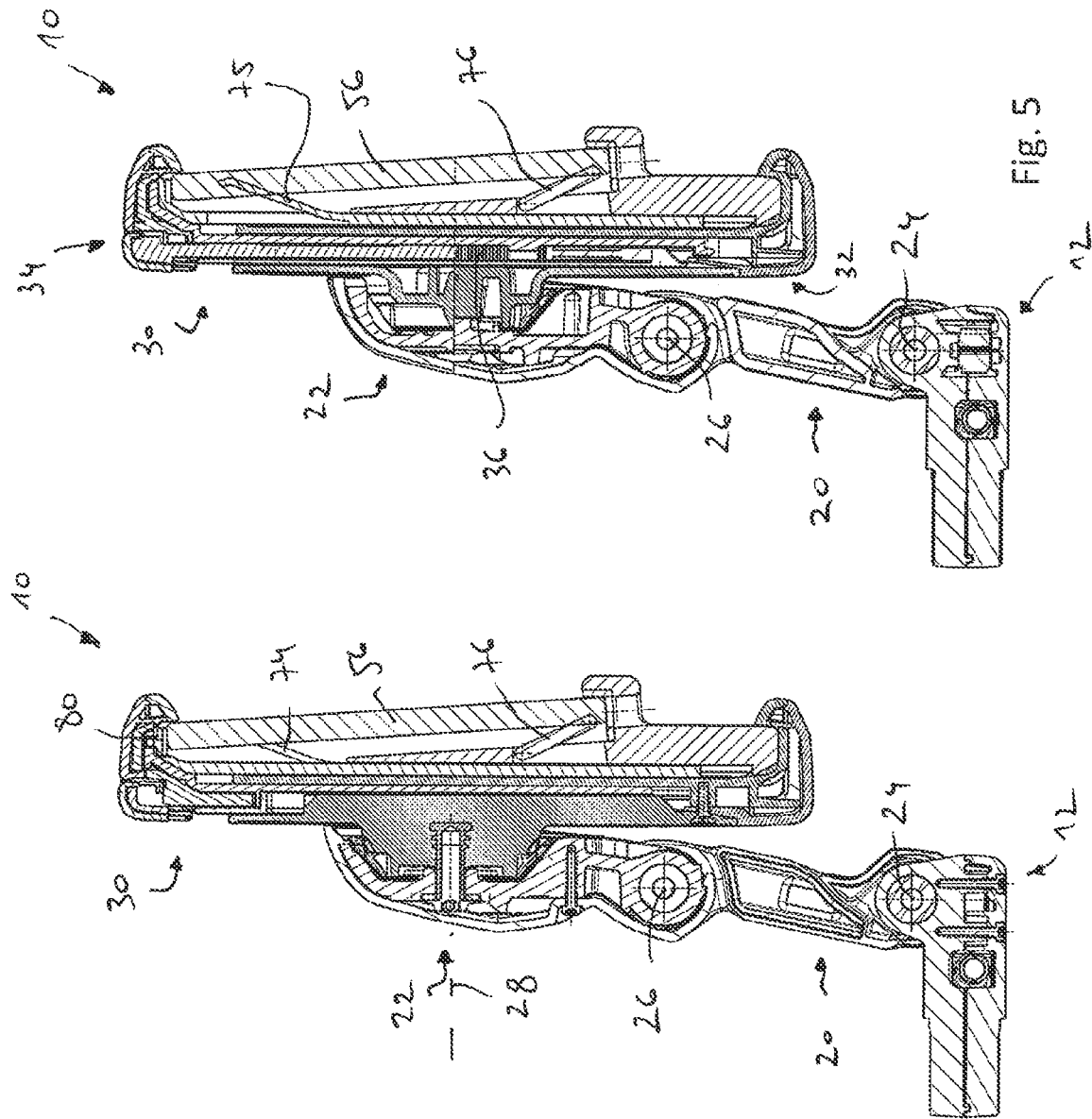

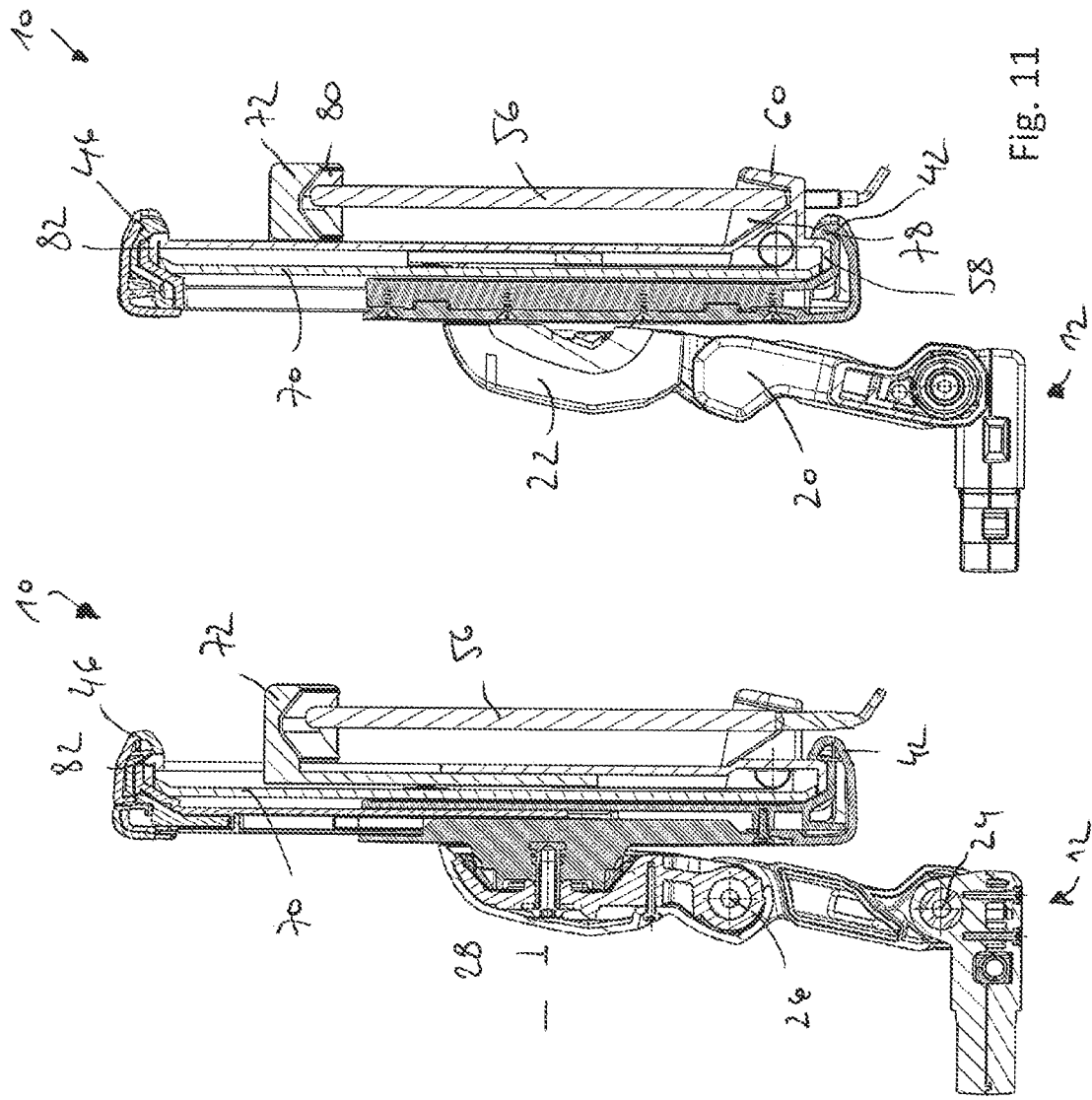

MOUNTING SYSTEM FOR DETACHABLY MOUNTING ELECTRONIC DEVICES IN A MOTOR VEHICLE

Figure 1:
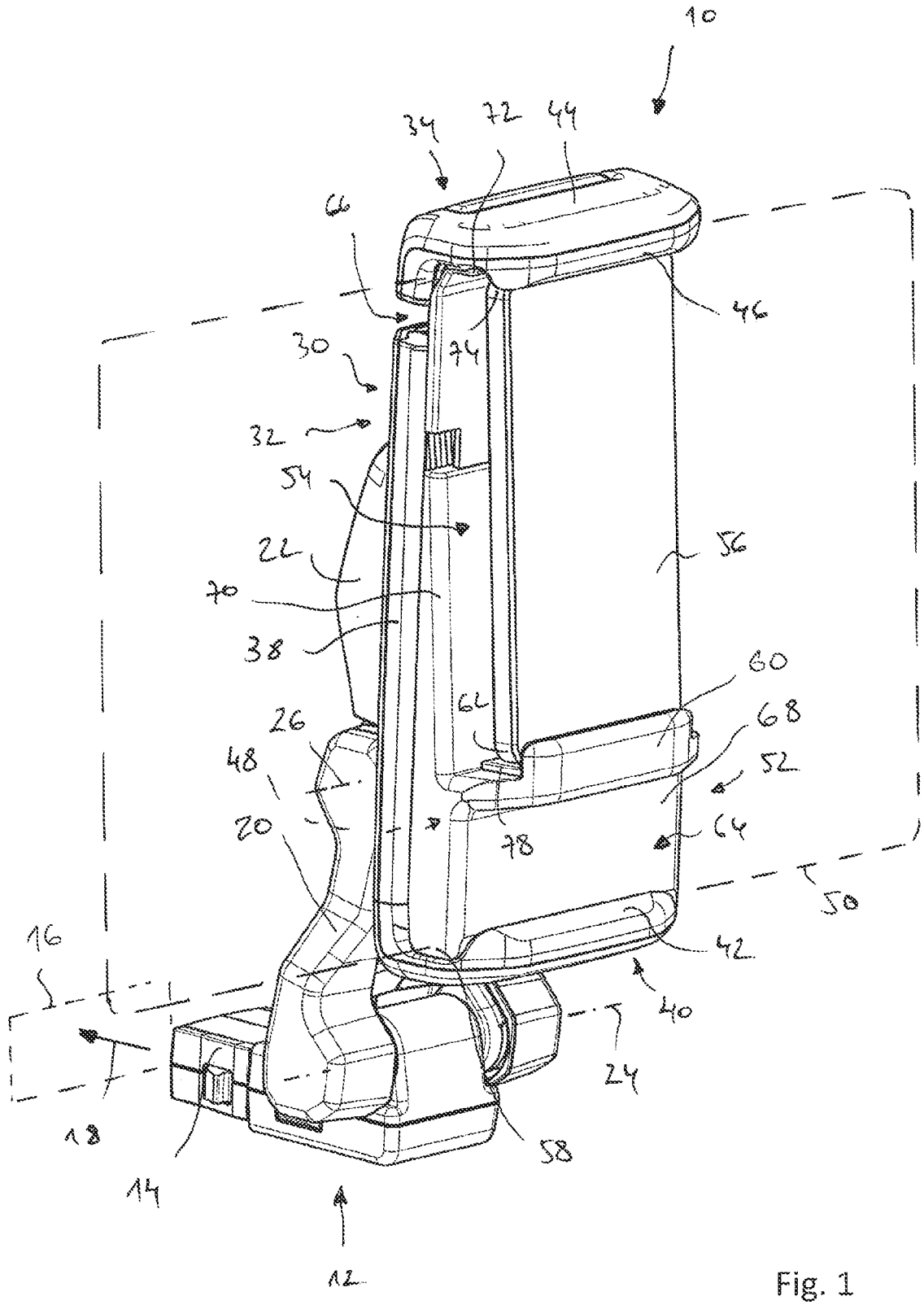

This application claims priority to German Patent Application No. 20 2021 104 338.5 filed on Aug. 13, 2021.

The invention relates to a mounting system for detachably mounting electronic devices in a motor vehicle, comprising a connecting section for connection to the motor vehicle, with a first holder connected to the connecting section, which first holder has a first holding space and first holding sections for holding a first electronic device.

Such a mounting system is known—for the example of the motor vehicle manufacturer BMW—under the name "Travel & Comfort System, Universal Holder." This system enables a simple mounting of a tablet computer to the first holder, possibly using a protective frame or a protective cover for the tablet computer.

The invention is based on the object of proposing a mounting system of the type mentioned above with even more diverse possible uses.

This object is achieved with a motor vehicle seat assembly of the aforementioned type by a second holder with a second holding space for holding a second electronic device, wherein the second holder can be arranged or is arranged in the first holding space and can be detachably fixed or is detachably fixed to the first holding sections.

The mounting system optionally enables an arrangement of a first electronic device in the first holding space or a second holder, which has a second holding space for holding a second electronic device. In particular, the second electronic device has smaller dimensions than the first electronic device.

For fixing the second holder, those first holding sections with which—when a first electronic device is arranged in the first holding space—the first electronic device is also held on the first holder are provided.

The mounting system has, as a connecting section, in particular a plug-in part that is at least indirectly connected to the first holder and can be detachably mounted to a vehicle seat by inserting the plug-in part into a receiving socket arranged on the motor vehicle seat and fixing it there, for example by means of a latching device.

With the mounting system, the first holder can remain in its installation location in the motor vehicle if a second electronic device with dimensions deviating from the first electronic device is to be used in place of the first electronic device. For this case, the second electronic device is arranged on the second holder, and the second holder is detachably fixed in the first holding space of the first holder.

In particular, the first electronic device is a tablet computer, and the second electronic device is a smartphone.

The second holder can also be referred to as an "adapter," which is in particular a smartphone adapter.

Preferably, the first holding sections are arranged on sides opposite one another of the first holding space, in order to optionally fix a first electronic device or the second holder to the first holder. In this manner, electronic devices, which usually have a rectangular shape, can be fixed on two sides facing away from one another. For this purpose, it is preferred that the first holding sections are formed in a clamp-like shape and engage in a positive-locking manner over an edge region of the front side of a first electronic device or the front side of the second holder.

It is further preferred if a gap between the first holding sections can be modified. In this manner, the height of the first holding space can be modified such that first electronic devices of different heights, second holders of different heights or second holders with variable dimensions can be arranged in the first holding space and fixed there.

To fix the second holder in the first holding space, it is proposed that the second holder comprises at least one edge section for an arrangement in one of the first holding sections. Such edge section of the second holder is then received in the first holding space of the first holder in place of a corresponding edge section of a first electronic device and is fixed to one of the first holding sections, in particular fixed in a positive-locking manner in the removal direction.

To mount the second electronic device to the second holder, it is preferred that the second holder has at least one second holding section for mounting a boundary edge of the second electronic device. Such second holding section can also be formed in a clamp-like shape, that is, it can overlap a front side of a second electronic device in a region adjacent to a side edge of the second electronic device.

It is further preferred that the at least one second holding section is spaced apart from the at least one edge section, whereby when the second holder is arranged in the first holding space of the first holder, the at least one second holding section is spaced apart from the first holding section in which the edge section is held such that a part of the first holding space is bridged by the gap between the at least one second holding section and the edge section. This allows a comparatively smaller second electronic device held on the second holder to be arranged in a larger first holding space.

In particular, the second holder has two second holding sections, which serve to mount boundary edges opposite one another of the second electronic device and which are arranged on sides opposite one another of the second holding space. In this manner, by means of the second holder, a second electronic device can be mounted in a manner with which a first electronic device can also be fixed in the first holding space of the first holder.

It is further preferred if the gap between the two second holding sections can be modified. This allows the size of the second holding space to be varied, in particular in order to be able to fix second electronic devices of different sizes on the second holder.

It is further preferred if the two second holding sections are preloaded in directions opposite to one another. Thereby, the preloading can be used to clasp a second electronic device under preloading. The preloading of the second holding sections can also serve to ensure that the second holder within the first holding space fills such first holding space under preloading.

For fixing or holding the second electronic device to the second holder, it is proposed for an arrangement of the second holder in the first holding space that the second electronic device is held by at least one second holding section of the second holder. At the same time, the second electronic device can be held by another second holding section of the second holder and/or by one of the first holding sections of the first holder.

When the second electronic device is fixed to two second holding sections of the second holder, the second electronic device can also be fixed to the second holder if the second holder is not arranged in the first holding space of the first holder.

When the second electronic device is fixed to a second holding section of the second holder and to a first holding section of the first holder, the first holder performs part of the holding function for holding the second electronic device to the second holder.

For a reliable fixing of the second electronic device to the second holder, it is proposed that the second holding space is delimited by elastic positive-locking or frictional locking elements, which cooperate with boundary edges of the second electronic device and/or with a rear side of the second electronic device facing the first holder. In this manner, second electronic devices of different thicknesses can also be reliably fixed to the second holder without rattling.

For a particularly flexible use of the mounting system, it is preferred that the first holding space is laterally open in the position of use of the mounting system and/or that the second holding space is laterally open in the position of use of the mounting system. This means that the respective holding spaces are delimited only at their upper end and lower end in the position of use of the mounting system (for example, by holding sections or positive-locking or frictional locking elements).

For a compact structure of the mounting system, it is preferred that the width of the first holding space measured in the position of use of the mounting system correspond to the width of the second holding space measured in the position of use of the mounting system.

For a compact structure of the mounting system, it is further preferred if, when the first electronic device in the form of a tablet computer is arranged on the first holder, the tablet computer overhangs the first holding space on sides of the first holding space facing away from one another.

Further features and advantages of the invention are the subject of the following description and the graphic representation of a preferred exemplary embodiment.

Figure 3:
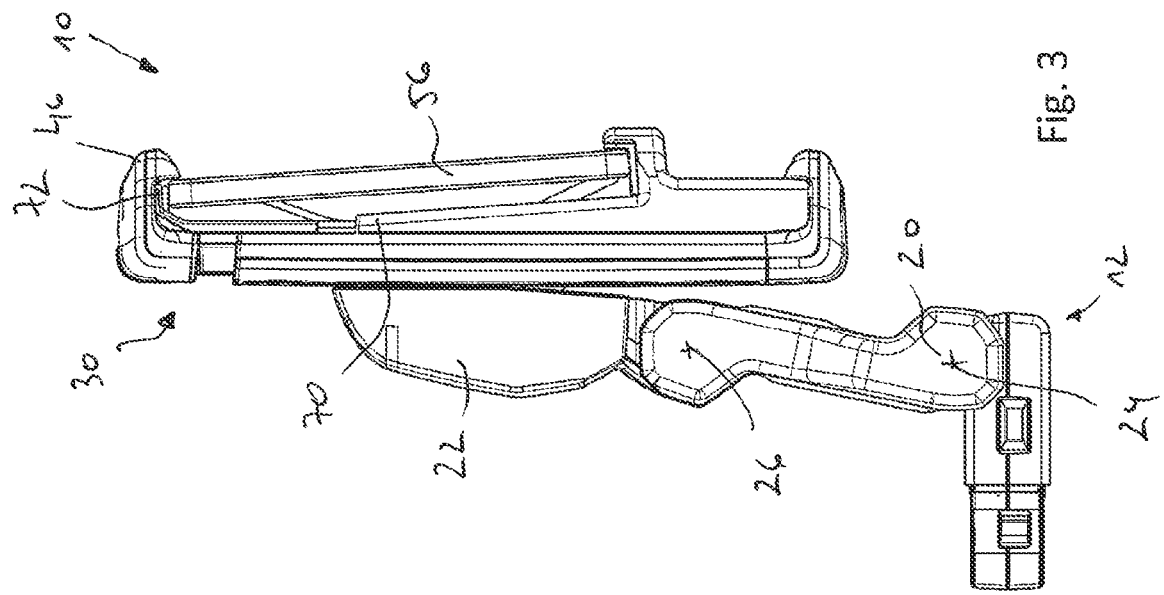
Figure 2:
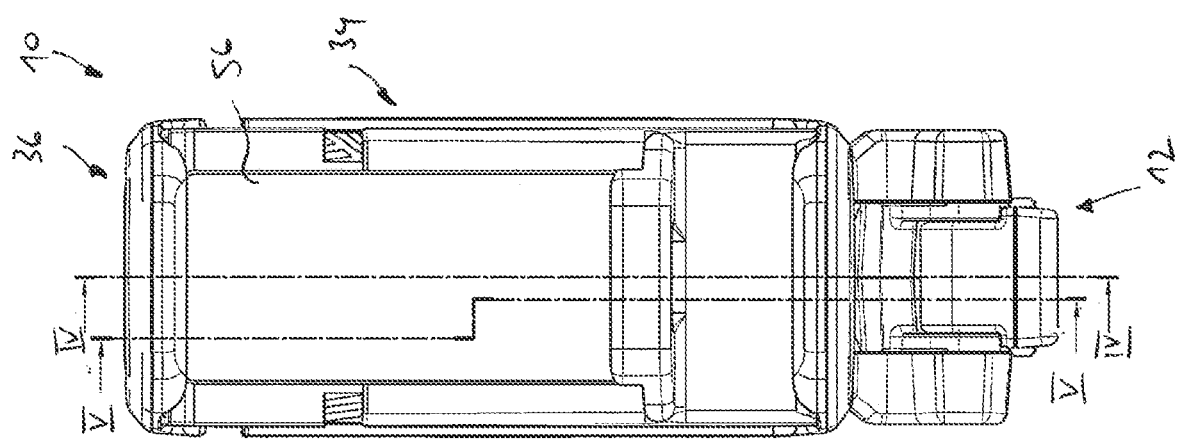
Figure 6:
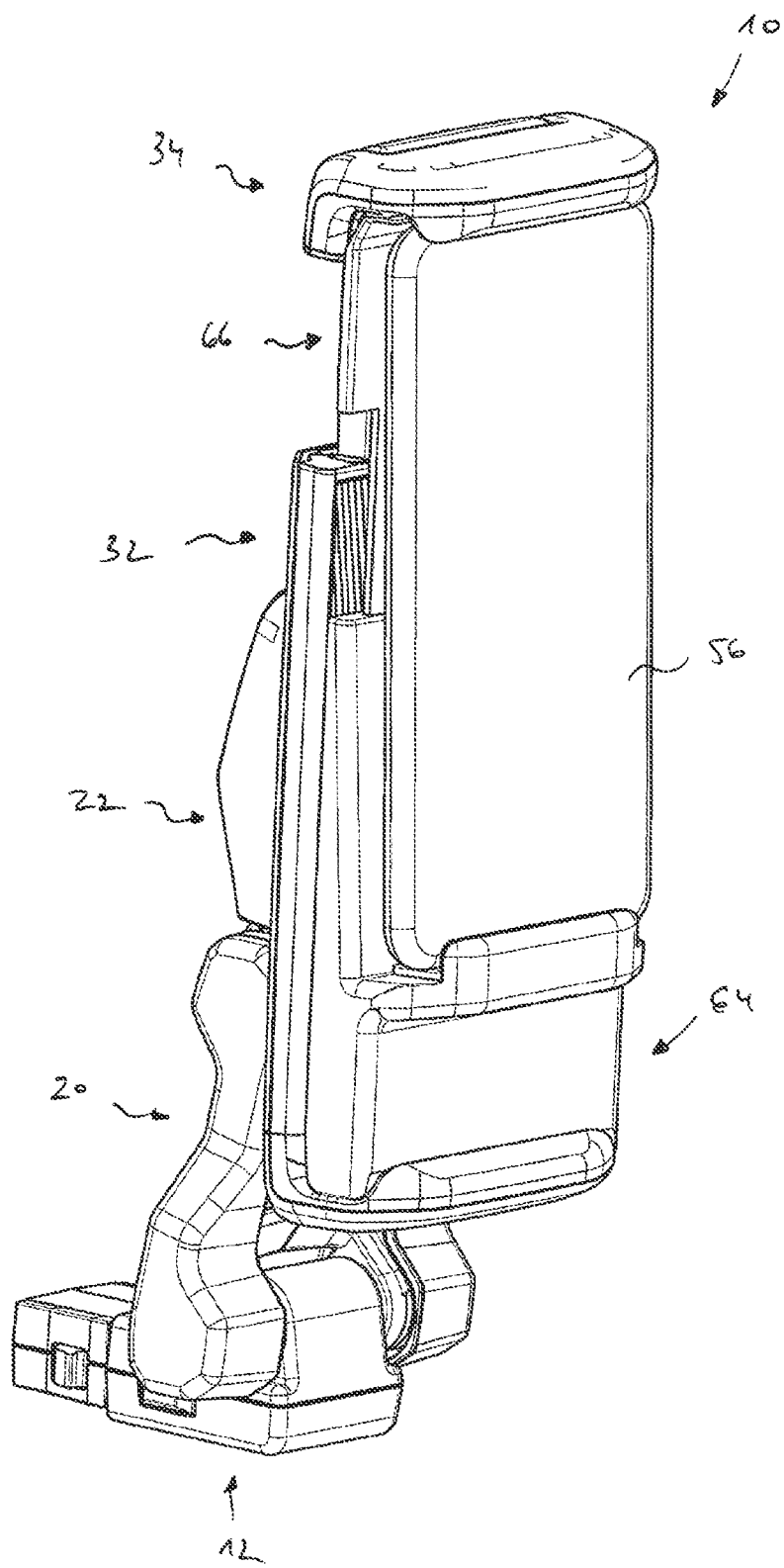
Figure 7:
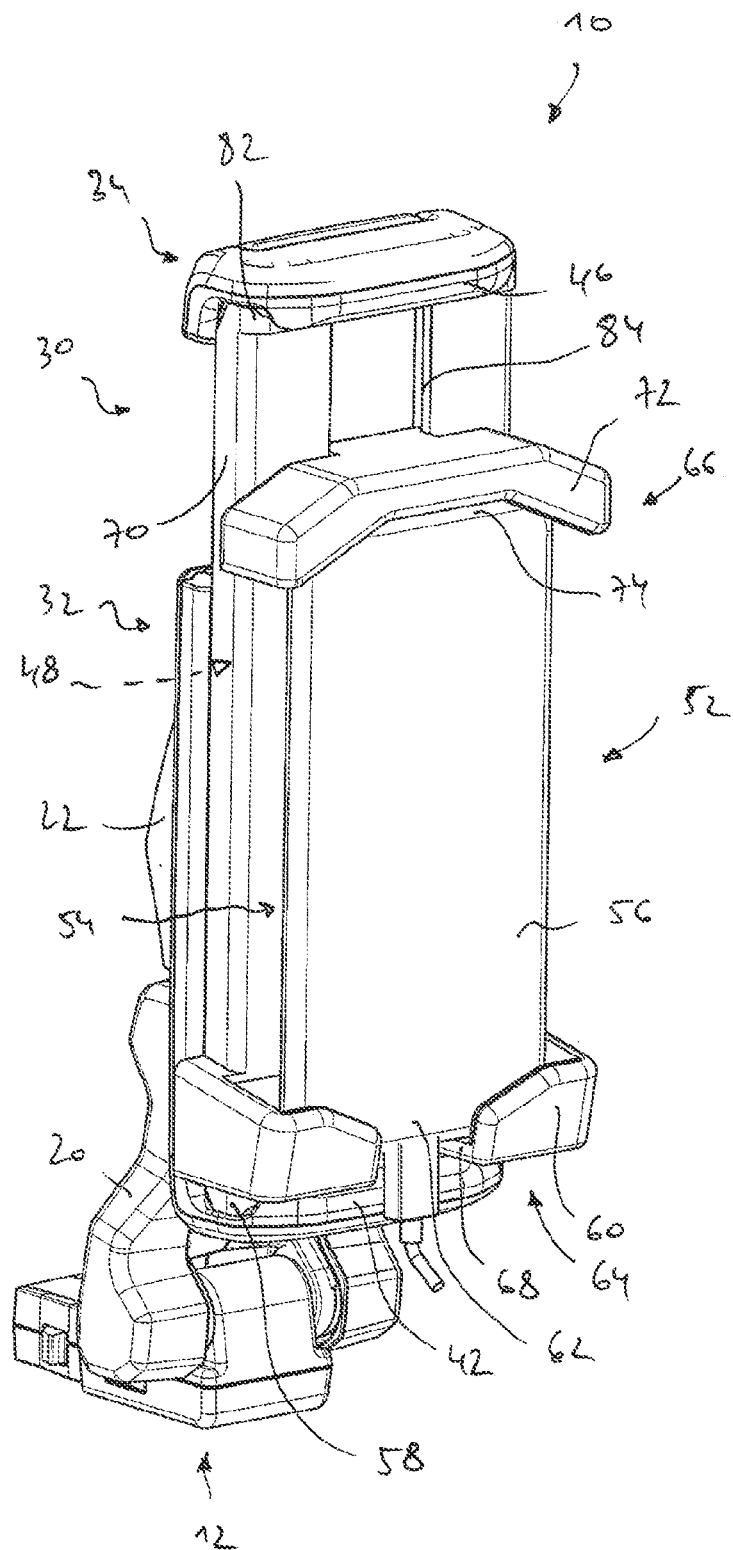
Figure 8:
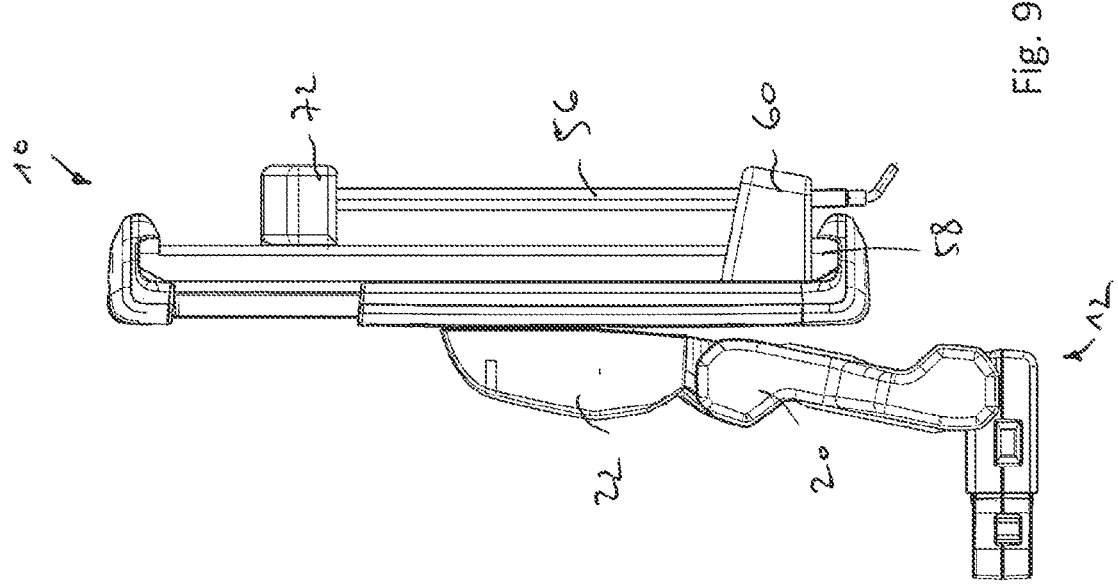
Figure 9:
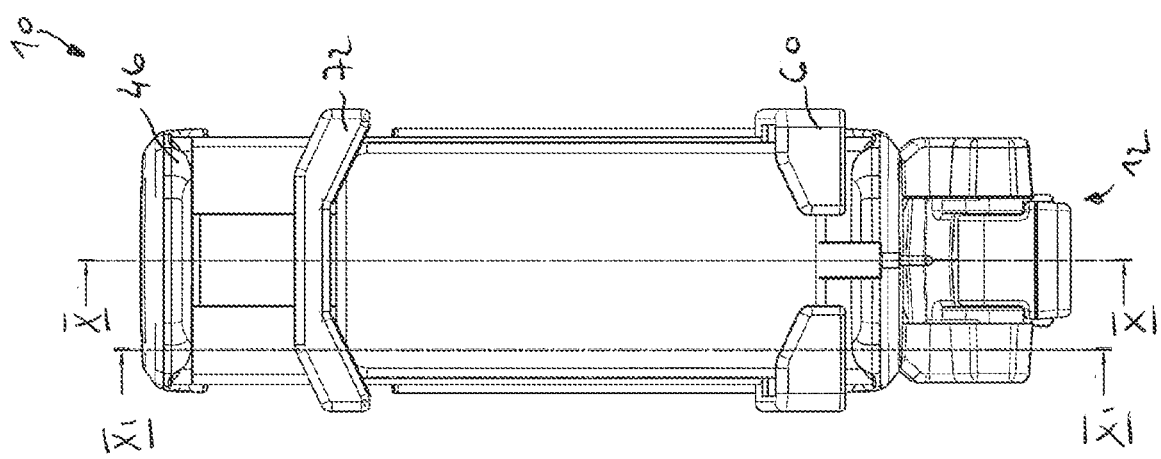
Figure 12:
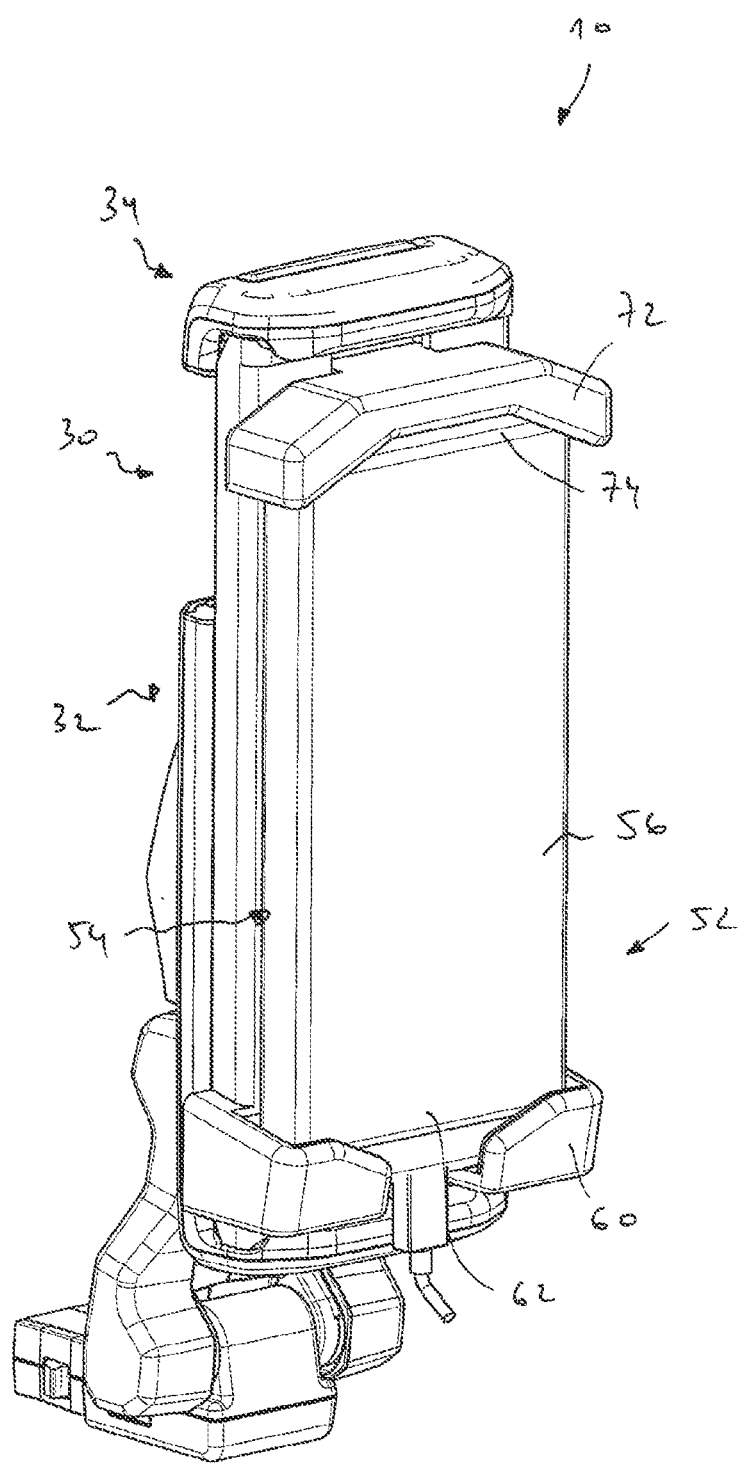

The drawing shows the following:

FIG. 1 A perspective view of an embodiment of a mounting system;

FIG. 2 A front view of the mounting system according to FIG. 1;

FIG. 3 A side view of the mounting system according to FIG. 1;

FIG. 4 A vertical section of the mounting system according to FIG. 1 along a section line marked IV-IV in FIG. 2;

FIG. 5 A vertical section of the mounting system according to FIG. 1 along a section line marked V-V in FIG. 2;

FIG. 6 An illustration corresponding to FIG. 1 with an arrangement of a comparatively larger electronic device;

FIG. 7 A perspective view of an additional embodiment of a mounting system;

FIG. 8 A front view of the mounting system according to FIG. 7;

FIG. 9 A side view of the mounting system according to FIG. 7;

FIG. 10 A vertical section of the mounting system according to FIG. 7 along a section line marked X-X in FIG. 8;

FIG. 11 A vertical section of the mounting system according to FIG. 7 along a section line marked XI-XI in FIG. 8; and FIG. 12 An illustration corresponding to FIG. 7 with an arrangement of a comparatively larger electronic device.

A mounting system shown in the drawing is designated in its entirety by reference sign 10. It comprises a connecting section 12 in the form of a plug-in part 14, which can be detachably fixed in a receiving socket 16, in particular in a latching manner. In particular, receiving socket 16 is part of a motor vehicle seat assembly and is arranged, for example, in the region of a backrest of a motor vehicle seat. For the connection between plug-in part 14 and receiving socket 16, it is sufficient to insert plug-in part 14 into receiving socket 16 according to an insertion direction 18 and to latch it there.

Mounting system 10 has at least one intermediate section 20, 22, wherein a first connecting section 20 is pivotable relative to plug-in part 14 about a first pivot axis 24 and is connected in an articulated manner to second intermediate section 22 via a second pivot axis 26.

Second intermediate section 22 defines an axis of rotation 28 for a first holder 30 rotatably mounted on second intermediate section 22; compare in particular FIGS. 1, 3 and 4. When arranged in a motor vehicle, pivot axes 24 and 26 and pivot axis 28 run substantially horizontally, wherein pivot axes 24 and 26 typically extend in a transverse direction of the vehicle and pivot axis 28 extend in a longitudinal direction of the vehicle.

Second holder 30 has a base part 32 and a cover part 34, the gap between which can be modified; compare FIGS. 1 and 6. For this purpose, cover part 34 is guided on base part 32 by means of a linear guide known per se. Base part 32 and cover part 34 can be latched relative to one another and optionally preloaded in directions facing each other by means of a spring 36; compare FIG. 5.

Base part 32 has a rear section 38 and a foot section 40 on which a first holding section 42 is formed; compare FIG. 1.

Cover part 34 has a head section 44 having an additional first holding section 46.

A first holding space 48 of first holder 30 is delimited between foot section 40 and head section 44. Such first holding space 48 is used, for example, for an arrangement of a first electronic device 50, which is indicated schematically in FIG. 1 by a rectangular outline and is formed, for example, as a tablet computer.

In place of first electronic device 50, a second holder 52 can be arranged in first holding space 48 and can have a second holding space 54 for holding a second electronic device 56.

Second holder 52 has an edge section 58 that serves for an arrangement in a first holding section 42 of first holder 30, thus it is receivable therein in place of an edge section of a first electronic device 50.

Second holder 52 further has a second holding section 60 for mounting a boundary edge 62 of second electronic device 56.

Second holding section 60 and edge section 58 are spaced apart from one another and are immovable relative to one another.

Edge section 58 and second holding section 60 are arranged on a lower part of second holder 52, which is designated in its entirety by reference sign 64, wherein an upper part 66 of second holder 52 is movable relative to lower part 64, such that a gap of upper part 66 from lower part 64 is adjustable; compare FIGS. 1 and 6.

Lower part 64 has a first material section 68 for forming edge section 58 and for spacing second holding section 60 from edge section 58. Lower part 64 further has a second material section 70 for supporting upper part 66.

Upper part 66 has an additional second holding section 72 that covers, but does not overlap, a boundary edge 74 of second electronic device 56.

Lower part 64 and upper part 66 are preloaded in directions opposite to and away from one another, such that second holding sections 60 and 72 of second holder 52 strive to assume a maximum gap relative to one another. In this manner, it is ensured that second holder 52 is preloaded in first holding space 48 of first holder 30.

With mounting system 10 according to FIGS. 1 to 6, a first holding section, in this case (upper) first holding section 46, of first holder 30 performs part of the holding function for second electronic device 56, which is clasped in a positive-locking manner by both (upper) first holding section 46 and second holding section 60 of second holder 52.

For a precise hold of second electronic device 56 in receiving space 54 of second holder 52, frictional locking elements 74, 76 may be provided, which may be in the form of tabs and may work together with a rear side of electronic device 56 facing first holder 30; compare FIGS. 4 and 5 (shown in a relaxed resting state in FIG. 5). Adjacent to boundary edges 62 and 74 of electronic device 56, further positive-locking or frictional locking elements 78, 80 may be arranged, compare FIGS. 1 and 4, for example in the form of elastomer lips or rails.

For use of mounting system 10, an initial state in which first holding space 48 of first holder 30 is not occupied is assumed. Based on this state, either a first electronic device 50 can be arranged in first holding space 48, wherein a gap between base section 32 and base section 34 is to be selected such that electronic device 50 is insertable into first holding space 48. By moving cover part 34 in the direction of base part 32, first electronic device 50 can then be fixed in place, wherein first holding sections 42 and 46 clasp first electronic device 50.

In place of the arrangement of a first electronic device 50, only second holder 52 can initially be arranged in first receiving space 48. For this purpose, it is possible to initially arrange only edge section 58 of second holder 52 within (lower) first holding section 42 of first holder 30, thereby pressing upper part 66 and lower part 64 against one another to such an extent that first holder 52 can be inserted into first holding space 48 of first holder 30. Starting from this, preferably by means of spring preloading, upper part 66 is moved such that upper part 66 is at a greater distance from lower part 64 and such that upper part 66 with its second holding section 72 comes into engagement with (upper) first holding section 46 of first holder 30.

For the subsequent positioning of second electronic device 56 in second holding space 54 of second holder 52, second electronic device 56 can initially be brought into the engagement region of (lower) second holding section 60 with lower boundary edge 62, and can then be brought into the engagement region of (upper) first holding section 46 with upper boundary edge 74 from a region outside (upper) first holding section 46 by pressing second electronic device 56 with its upper boundary edge 74 against the outside of (upper) first holding section 46. As a result, cover part 34 deflects upwardly against the action of spring 36; second electronic device 56 completely enters first receiving space 54 of second holder 52, and subsequently cover part 34 moves back in the direction of base part 32 due to the action of spring 36. In such state, second electronic device 56 is fixed to second holder 52, while second holder 52 is in turn fixed to first holder 30.

To remove second electronic device 56, it is possible to move cover part 34 upwardly against the action of spring 36 and remove second electronic device 56 from second holding space 54.

With the embodiment described above with reference to FIGS. 1 to 6, one of the first holding sections of first holder 30, in this case (upper) first holding section 46, performs a holding function for second electronic device 56. With an embodiment of a mounting system 10 described below with reference to FIGS. 7 to 12, a holding function at upper boundary edge 74 of second electronic device 56 is realized by a second holding section 72 of second holder 52, which is provided independently of (upper) first holding section 46 of first holder 30.

For the structure and operation of mounting system 10 according to FIGS. 7 to 12, reference is made to the preceding description of FIGS. 1 to 6; the special features of the mounting system 10 according to FIGS. 7 to 12 are discussed below.

First material section 68 of lower part 64 of second holder 52 has only a small overall height; in contrast, second material section 70 of lower part 64 has a length that is greater than a maximum height of electronic device 56. Second material section 70 extends to a stop 82; compare FIG. 7. Stop 82 is received in (upper) first holding section 46 of first holder 30. The gap between edge section 58 and stop 82 can be modified. First holding section 46 is spring-mounted in a movable/articulated manner on cover part 34.

A guide 84 is provided on second material section 70 of second holder 52 for (upper) second holding section 72 of second holder 72. By modifying the positions of second holding section 72 relative to lower part 64, a gap between two second holding sections 60 and 72 of second holder 52 is adjustable, such that second electronic devices 56 of different sizes can be received and fixed in second holding space 54 of second holder 52.

Two second holding sections 60 and 62 are preloaded in the direction of one another, such that two second holding sections 60 and 72 strive to occupy the smallest possible gap relative to one another.

Starting from a state in which first holding space 48 of first holder 30 is not occupied and in which a certain gap between base part 32 and cover part 34 is set, a first electronic device 50 (compare FIG. 1) can be arranged in first holding space 48. In this respect, reference is made to the above description.

For an arrangement of second holder 52, edge section 48 of second holder 52 is brought into engagement with (lower) first holding section 42 of first holder 30, wherein stop 82 is initially still out of engagement with (upper) first holding section 46 of first holder 30. By tilting second material section 70 into receiving space 48, (upper) first holding section 46 springs out, such that stop 82 can be arranged in the clasping region of (upper) first holding section 46 and is fixed there, wherein the gap between base part 32 and cover part 34 of first holder 30 depends exclusively on the size of second holder 52 and not on the size or height of a second electronic device 56 to be held; compare FIGS. 7 and 12.

For an arrangement of a second electronic device 56 on second holder 52, second electronic device 56 can initially be brought with its upper boundary edge 54 into engagement with (upper) second holding section 72, in order to displace the latter together with second electronic device 56 in the direction of (upper) first holding section 46 of first holder 30 until lower boundary edge 62 of second electronic device 56 can be inserted into the effective range of (lower) second holding section 60. The subsequent fixing of second electronic device 56 takes place by means of spring force, which urges (upper) second holding section 72 in the direction of (lower) second holding section 60.

For removal of second electronic device 56, second electronic device 56 can be moved upwardly together with (upper) second holding section 72 until lower boundary edge 72 becomes disengaged from (lower) second holding section 60 and second electronic device 56 can be removed from second holding space 54 of first holder 52.

The invention claimed is:

1. A mounting system for detachably mounting electronic devices in a motor vehicle, comprising a connecting section for connection to the motor vehicle, with a first holder connected to connecting section, which first holder has a first holding space and first holding sections for holding a first electronic device, and a second holder with a second holding space for holding a second electronic device, wherein the second holder can be arranged or is arranged in first holding space and can be detachably fixed or is detachably fixed to the first holding sections.

2. The mounting system according to claim 1, wherein the first electronic device is a tablet computer and the second electronic device is a smartphone.

3. The mounting system according to claim 2, wherein the first holding sections are arranged on sides opposite one another of the first holding space.

4. The mounting system according to claim 3, wherein a gap between the first holding sections can be modified.

5. The mounting system according to claim 4, wherein the second holder comprises at least one edge section for an arrangement in one of the first holding sections.

6. The mounting system according to claim 2, wherein a gap between the first holding sections can be modified.

7. The mounting system according to claim 1, wherein the first holding sections are arranged on sides opposite one another of the first holding space.

8. The mounting system according to claim 7, wherein a gap between the first holding sections can be modified.

9. The mounting system according to claim 1, wherein a gap between the first holding sections can be modified.

10. The mounting system according to claim 1, wherein the second holder comprises at least one edge section for an arrangement in one of the first holding sections.

11. The mounting system according to claim 10, wherein the second holder comprises at least one second holding section for mounting a boundary edge of the second electronic device, and the at least one second holding section is spaced apart from at least one edge section.

12. The mounting system according to claim 1, wherein the second holder comprises at least one second holding section for mounting a boundary edge of the second electronic device.

13. The mounting system according to claim 1, wherein the second holder comprises two second holding sections, which serve to mount boundary edges opposite one another of the second electronic device and which are arranged on sides opposite one another of the second holding space.

14. The mounting system according to claim 13, wherein the gap between the two second holding sections can be modified.

15. The mounting system according to claim 14, wherein the two second holding sections are preloaded in directions opposite to one another.

16. The mounting system according to claim 1, wherein when the second holder is arranged in the first holding space and when the second electronic device is arranged in the second holding space, the second electronic device is held:
  a) By a second holding section of the second holder, and
  b) By an additional second holding section of the second holder and/or by one of the first holding sections of the first holder.

17. The mounting system according to claim 1, wherein the second holding space is delimited by elastic positive-locking or frictional locking elements, which cooperate with boundary edges of the second electronic device and/or with a rear side of the second electronic device facing the first holder.

18. The mounting system according to claim 1, wherein the first holding space is laterally open in the position of use of the mounting system and/or the second holding space is laterally open in the position of use of the mounting system.

19. The mounting system according to claim 1, wherein the width of the first holding space measured in the position of use of the mounting system corresponds to the width of the second holding space measured in the position of use of the mounting system.

20. The mounting system according to claim 1, wherein, when the first electronic device in the form of a tablet computer is arranged on the first holder, the tablet computer overhangs the first holding space on sides of the first holding space facing away from each other.

\* \* \* \* \*